United States Patent

Hill, Jr.

[11] Patent Number: 5,964,537
[45] Date of Patent: Oct. 12, 1999

[54] SKATE BEARING INSERTS AND METHOD OF REMOVAL AND INSERTION INTO A SKATE WHEEL

[76] Inventor: William C. Hill, Jr., 4018 42nd Ave., N., St. Petersburg, Fla. 33714

[21] Appl. No.: 08/168,669

[22] Filed: Dec. 16, 1993

Related U.S. Application Data

[63] Continuation-in-part of application No. 08/050,507, Apr. 20, 1993, Pat. No. 5,271,633.

[51] Int. Cl.⁶ .............................. A63C 17/06; F16C 33/58
[52] U.S. Cl. .......................... 384/559; 29/280; 280/11.22
[58] Field of Search ........................... 29/898.07, 898.08, 29/278, 280; 384/559, 561; 280/11.19, 11.22, 11.23, 11.24

[56] References Cited

U.S. PATENT DOCUMENTS

| | | | |
|---|---|---|---|
| 1,068,017 | 7/1913 | Stuebner | 384/561 |
| 1,398,813 | 10/1921 | Muck | 280/11.19 |
| 1,536,553 | 5/1925 | Anderson, Jr. | 29/898.08 X |
| 1,572,567 | 2/1926 | Skorka | 280/11.22 |
| 2,021,361 | 11/1935 | Marx | 280/11.19 |
| 2,073,708 | 3/1937 | Parrish | 280/11.23 X |
| 2,105,354 | 1/1938 | Hoerle . | |
| 2,620,241 | 12/1952 | Potter | 29/898.08 X |
| 3,001,841 | 9/1961 | Glavan et al. | 29/898.08 X |
| 3,309,155 | 3/1967 | Palmer . | |
| 3,348,289 | 10/1967 | Marsh | 29/898.07 X |
| 3,451,736 | 6/1969 | Riccio | 29/898.07 X |
| 4,294,455 | 10/1981 | Krueger | 280/11.19 X |
| 4,603,868 | 8/1986 | Schütz | 280/11.22 X |
| 4,940,342 | 7/1990 | Miyazawa et al. | 384/559 X |

Primary Examiner—Joseph M. Gorski
Attorney, Agent, or Firm—Larson & Larson, P.A.; James E. Larson

[57] ABSTRACT

A pair of skate bearing inserts are inserted into a hub of an in-line skate, roller skate, or skateboard. The bearing inserts have an integral cylindrical extension of a second axial end of an inner race thereby eliminating the need for a separate spacing member within a hub of a skate wheel. An inner groove along an inner circumference of the inner race engages with a bearing insert tool for quick removal and insertion of bearing inserts from skate wheels. A groove along a flange of a first axial end of the inner race allows for attachment of a reflective element to an outer surface of the skate wheel.

9 Claims, 9 Drawing Sheets

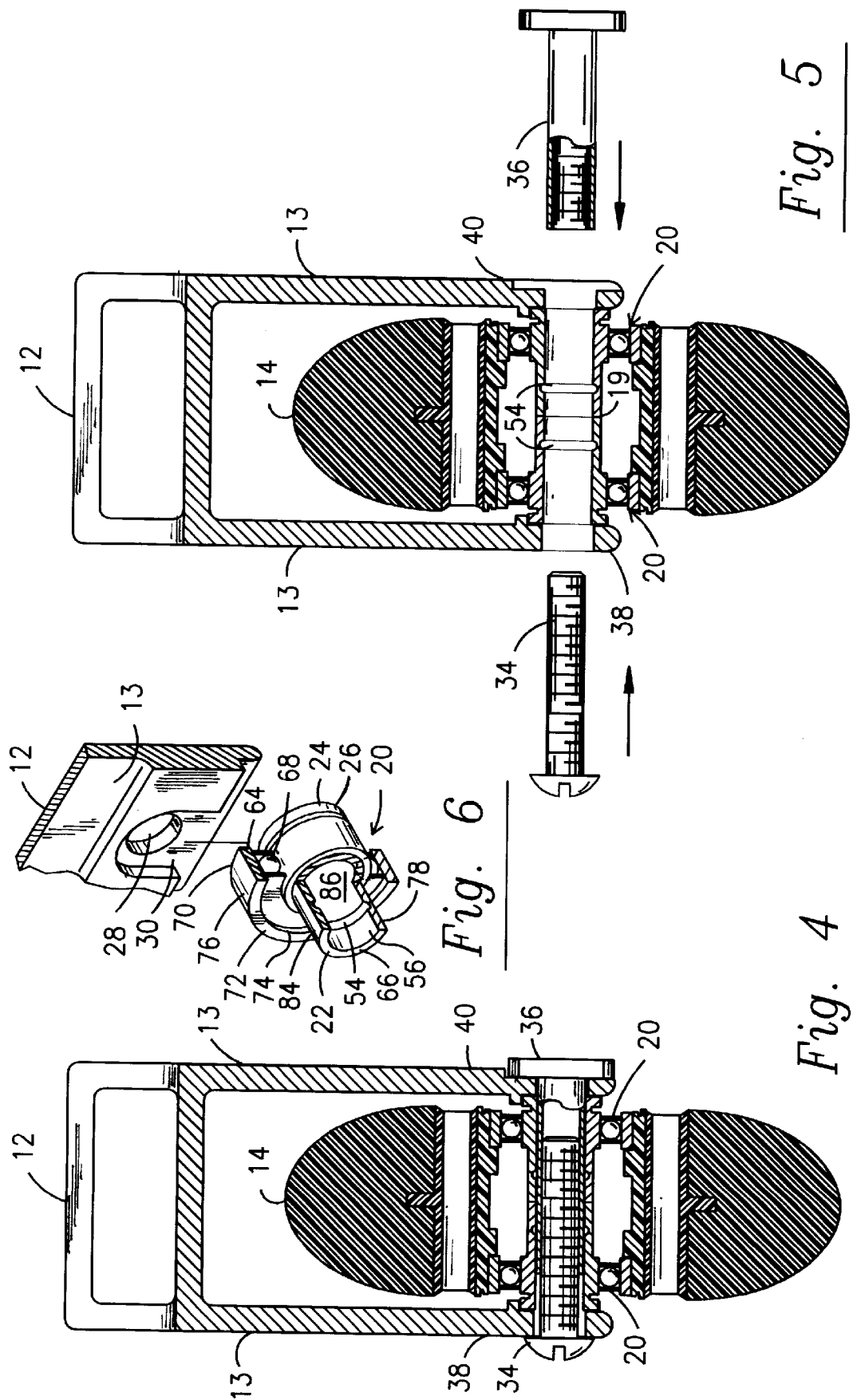

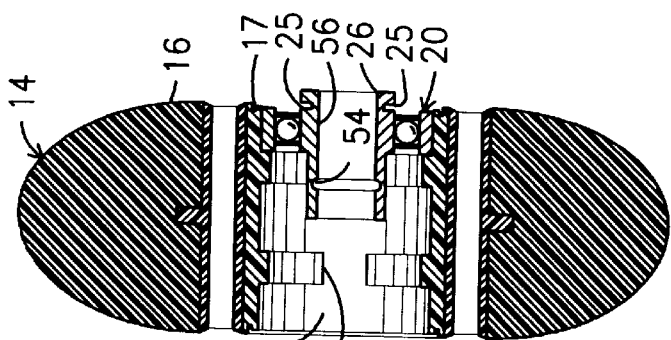
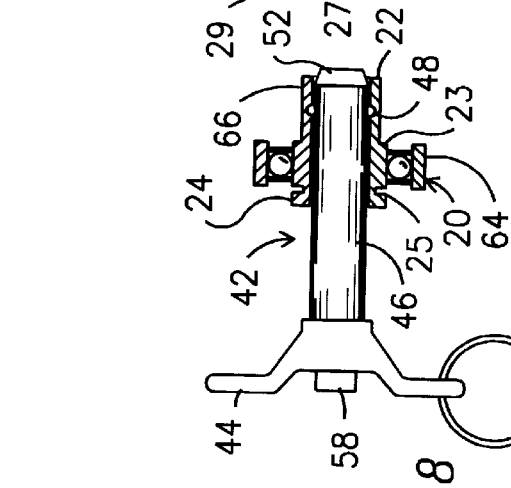
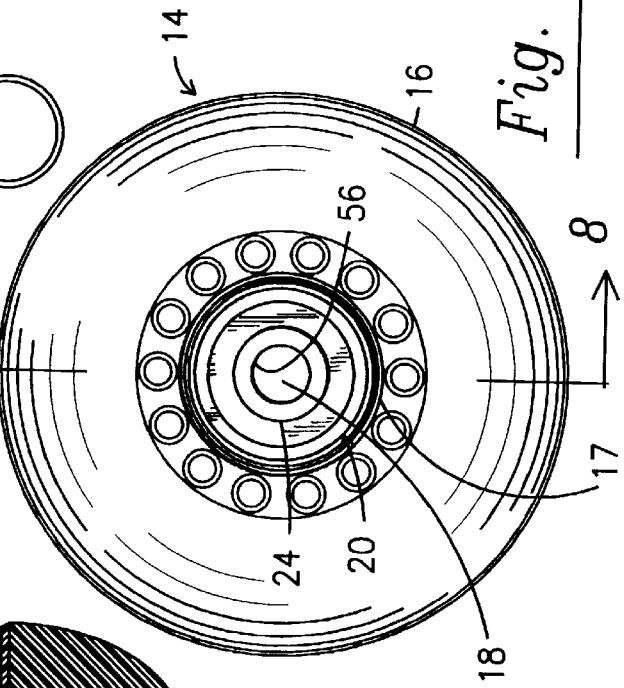
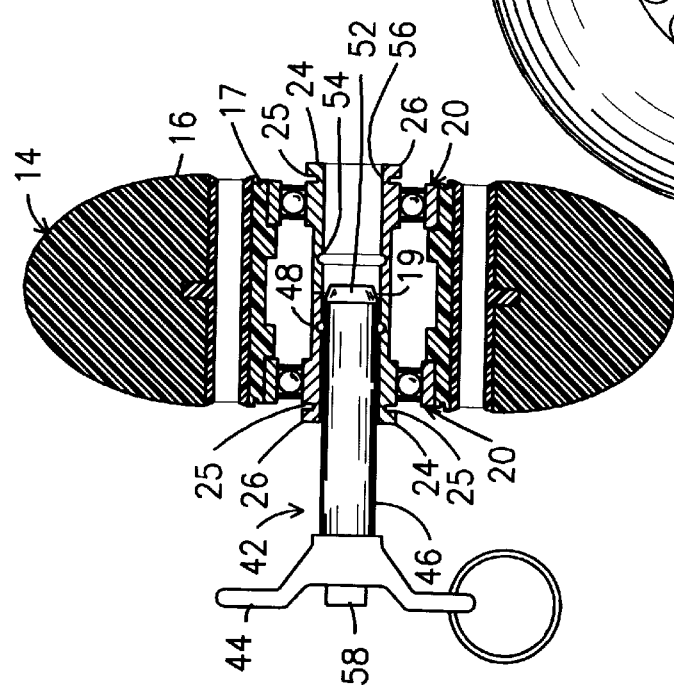

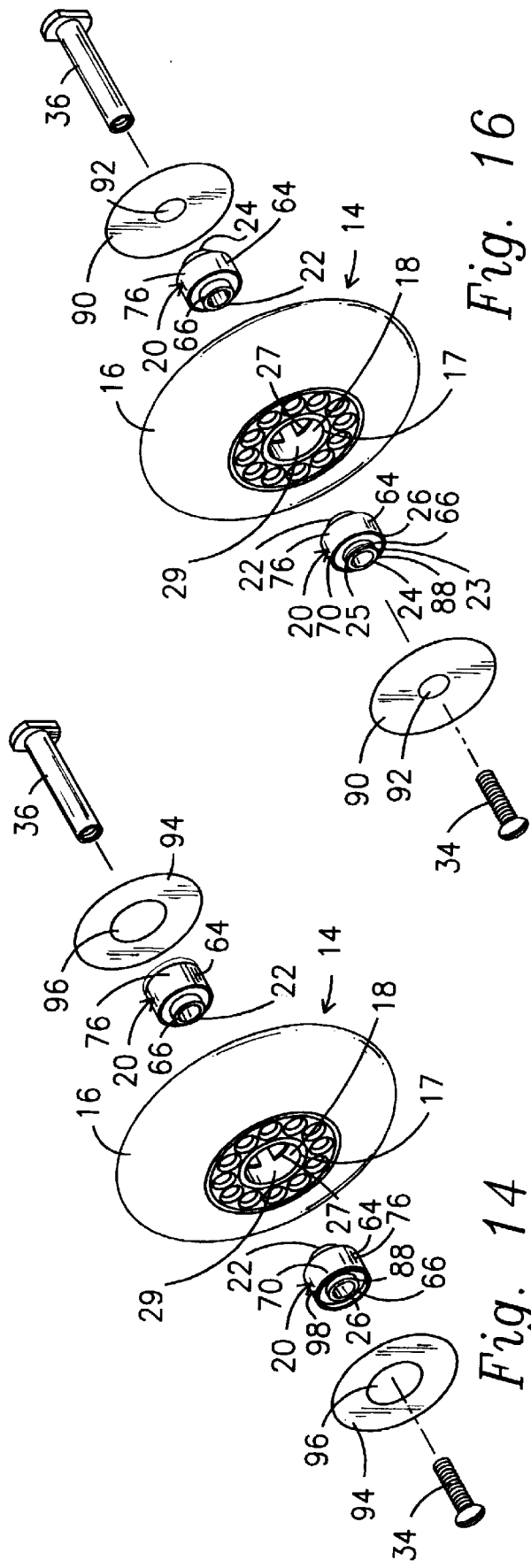

SKATE BEARING INSERTS AND METHOD OF REMOVAL AND INSERTION INTO A SKATE WHEEL

PRIOR APPLICATION

This application is a continuation-in-part of Ser. No. 08/050,507, filed Apr. 20, 1993, U.S. Pat. No. 5,271,633.

BACKGROUND OF THE INVENTION

1. Field of the Invention

This invention relates to bearing inserts for skates. More particularly, it relates to a pair of quick release ball bearing inserts for insertion into a hub of a wheel of in-line skates, roller skates, and skateboards.

2. Description of Prior Art

In-line skates, roller skates, and skateboards are well known and currently used by individuals for purposes of exercise and pleasure. In-line skates are additionally used in racing competition. Some examples of in-line skates are seen in U.S. Pat. Nos. 3,837,662, 4,034,995, 4,666,168, and 4,666,169.

Individuals who use in-line skates, roller skates, and skateboards for exercise and pleasure must keep their respective skates in good working order and must periodically replace worn out parts, such as wheels and bearings, so that the skate may continue to function properly. Individuals who race and compete using in-line skates must keep their skates in top working condition and are frequently forced to replace parts, such as wheels and bearings, during competition due to additional stress placed on the wheels and bearings during such competition. As bearings rotate, flaking of the metal balls and metal races occurs leaving small metal particles within the bearing. This flaking is accelerated in high stress performance use of the skate, such as competition.

The known in-line skates, roller skates, and skateboards do not have easily replaceable bearings to permit quick replacement of the bearings in the wheel. Bearings that are known and currently used in in-line skates, roller skates, and skateboards which are not quick release are shown in U.S. Pat. Nos. 2,105,354 and 3,309,155. Further, the known in-line skates are not equipped with alignment elements which would enable the skater to quickly drop in and align a wheel for rapid replacement. These two inadequacies cause a competitive skater to use too much time for repairs thereby resulting in either a loss or disqualification from a race. Individuals using skates for pleasure and exercise are forced to have their skates maintained by a repairman due to not having the proper tools to replace conventional bearings. In addition, known bearings used in skates utilize a spacing element between the pair of bearings in each respective wheel. This additional element is sometimes misplaced during replacement of the bearings thereby causing the wheel of a skate to not function.

There exists a need for a quick release bearing insert for in-line skates, roller skates, and skateboards. Additionally, there exists a need for a bearing insert incorporating the spacing element integrally into the bearing insert thereby eliminating the need for a separate spacing element. Still further, it would be advantageous to incorporate and attach a reflective element to an outer surface of a skate wheel to brightly illuminate a skater, especially for use during twilight and night time hours.

SUMMARY OF THE INVENTION

I have invented an improved skate bearing insert which enables a skater to quickly remove and insert bearings in a wheel of an in-line skate, roller skate, and skateboard with minimal effort. In addition, I have incorporated an integral spacing extension into the bearing inserts thereby eliminating the need for a separate spacing element inserted between the pair of bearing inserts. Still further, I have provided a means for removing and replacing the bearing insert without touching the bearing insert utilizing a bearing insert tool and a means for attaching a reflective element to an outer surface of the bearing insert to provide illumination of a skater.

My skate bearing insert employs ball bearings intermediate an outer and inner race. The inner race has an integral extension of a second axial end abutting the integral extension of an opposed bearing insert of a respective second axial end when a pair of bearing inserts are inserted into a hub of a skate wheel. The integral extensions of the second axial ends of the pair of bearing inserts eliminates the need for a spacer between the two bearing inserts. An inner circumference of the inner race has an inner groove to engage with nipples of a bearing insert tool. The bearing insert tool has a shaft, a head portion, the nipples on the shaft, and a finger grip portion. The bearing insert tool enables an individual to quickly remove and replace a bearing insert thereby eliminating the need for the individual to touch the bearing insert during such removal and replacement. Additionally, the bearing insert tool provides a means for cleaning the bearing insert without touching it.

A flange of a first axial end of the inner race of the bearing insert has a first groove along an outer circumference of the flange to engage a first reflective element. In an alternate embodiment, a second reflective element engages a second groove along an outer circumference of the first axial end of the outer race of the bearing insert.

BRIEF DESCRIPTION OF THE DRAWINGS

The invention may be best understood by those having ordinary skill in the art by reference to the following detailed description when considered in conjunction with the accompanying drawings in which:

FIG. 4 is a sectional view of the in-line skate housing with a mounted wheel in a pocket along lines 4—4 of FIG. 2 with a bolt inserted;

FIG. 5 is a sectional view of the in-line skate housing with the mounted wheel in a pocket along lines 4—4 of FIG. 2 with a bolt removed;

FIG. 6 is a sectional perspective view of a bearing insert about to be inserted into a pocket of the in-line skate housing;

FIG. 7 is a side elevational view of an in-line skate wheel with the bearing inserts in place;

FIG. 8 is a sectional view of an in-line skate wheel along lines 8—8 of FIG. 7 with a bearing insert tool inserted into a bearing insert;

FIG. 9 is a sectional view of an in-line skate wheel along lines 8—8 of FIG. 7 with the bearing insert tool removing a bearing insert from an in-line skate wheel;

FIG. 14 is an exploded perspective view of an in-line skate wheel showing a pair of bearing inserts removed and a pair of reflective elements engagable with the bearing inserts along a groove on an outer circumference of an outer race of the bearing insert;

FIG. 15 is a perspective view of an in-line skate wheel showing a pair of bearing inserts inserted and a reflective element engaging the bearing insert along a groove on the outer circumference of the outer race of the bearing insert;

FIG. 16 is an exploded perspective view of an in-line skate wheel showing a pair of bearing inserts removed and a pair of reflective elements engagable with the bearing inserts along a groove on an outer circumference of an inner race of the bearing insert;

FIG. 17 is a perspective view of an in-line skate wheel showing a pair of bearing inserts inserted and a reflective element engaging the bearing insert along a groove on the outer circumference of the inner race of the bearing insert;

DETAILED DESCRIPTION OF THE INVENTION

Figure 1:
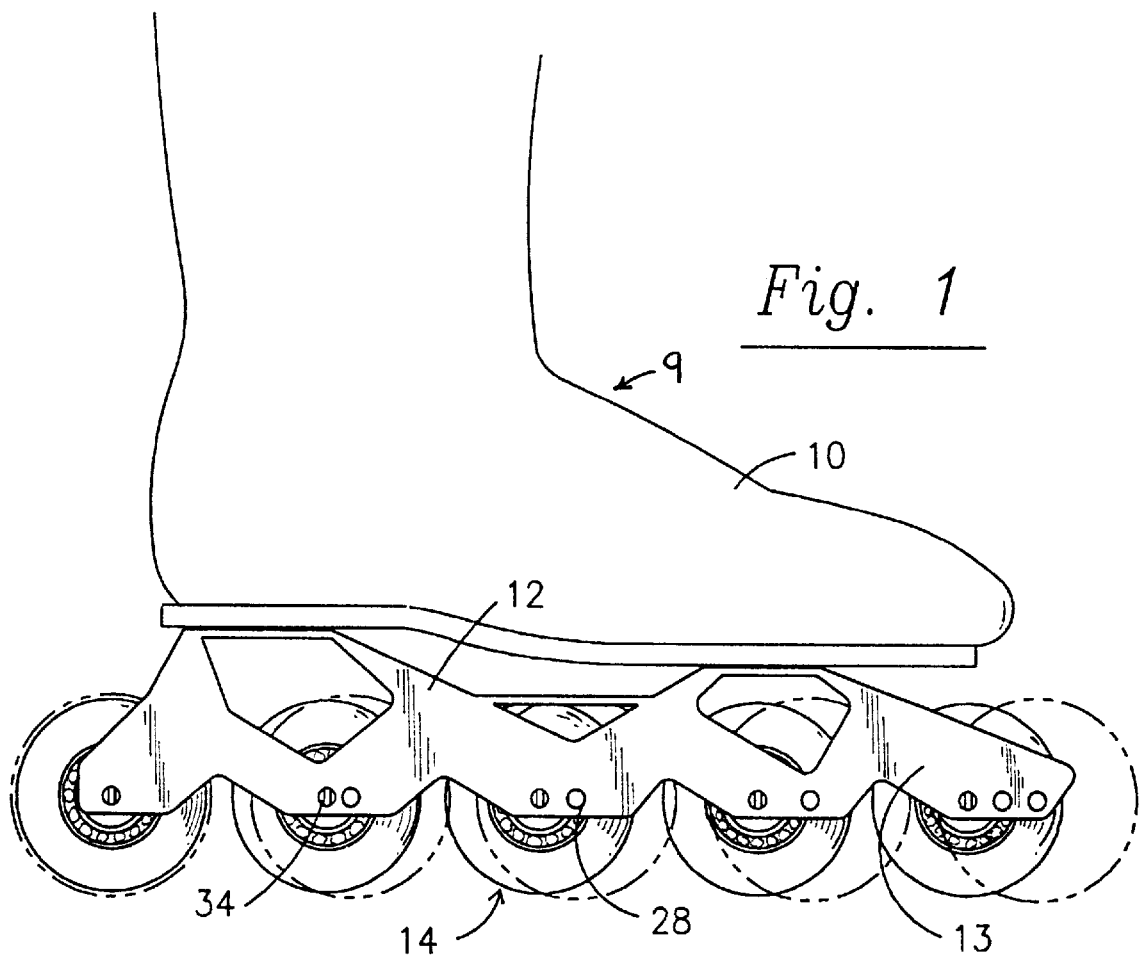
FIG. 1 is a side elevational view of an in-line skate housing with mounted wheels attached to a boot.

Throughout the following detailed description, the same reference numerals refer to the same elements in all figures.

Figure 3:
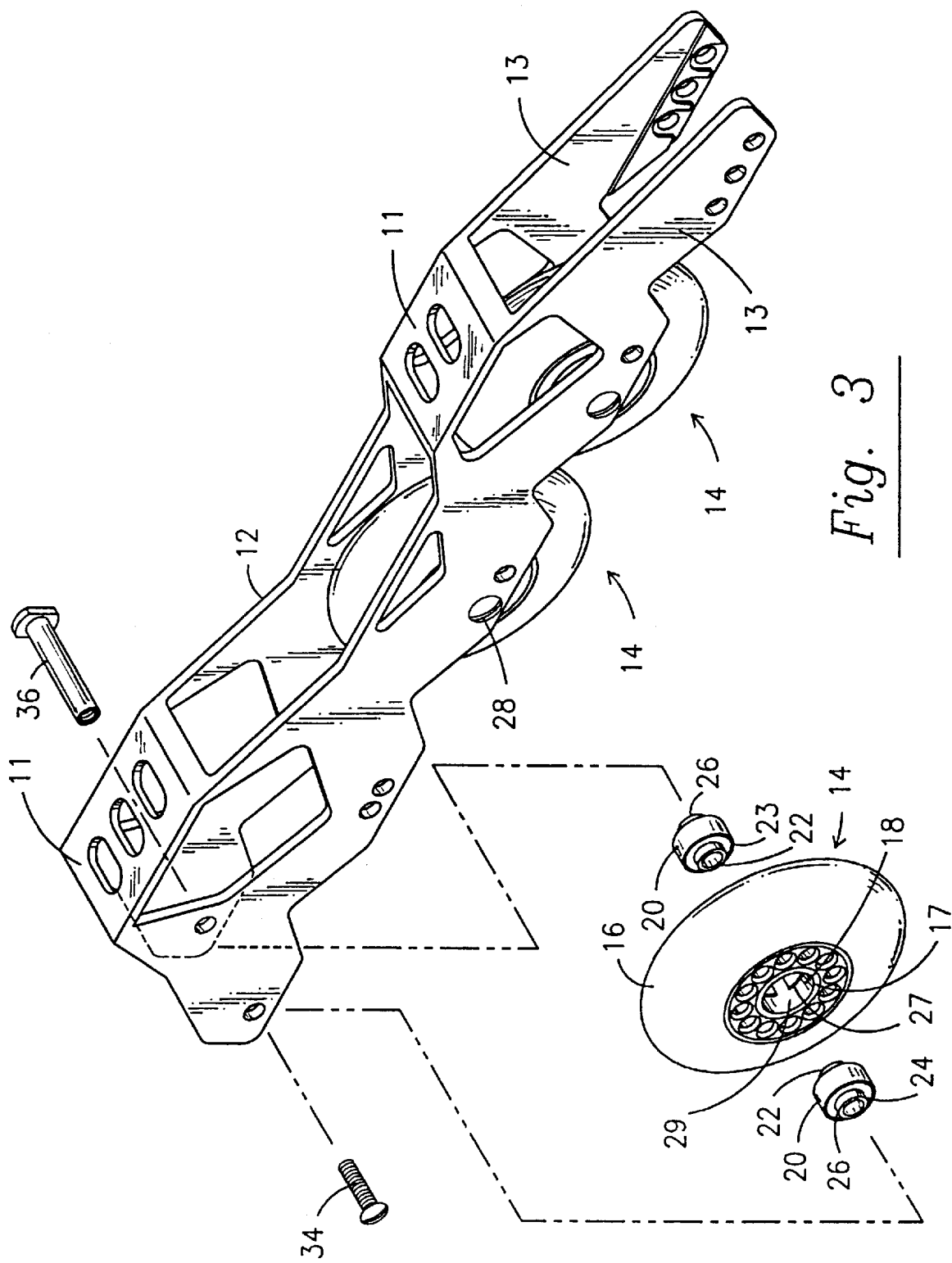
FIG. 3 is an exploded view of the in-line skate housing showing a skate wheel and pair of bearing inserts removed from a hub of the wheel.
Figure 10:
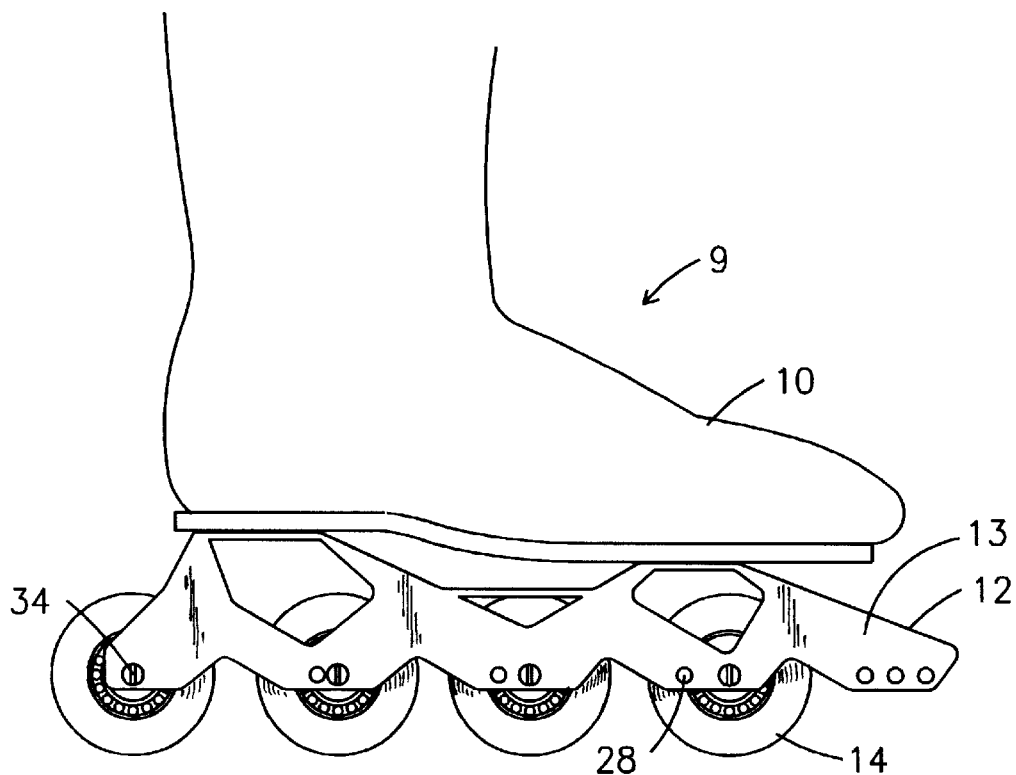
FIG. 10 is a side elevational view of the in-line skate housing showing an alternate in-line skate wheel configuration.
Figure 11:
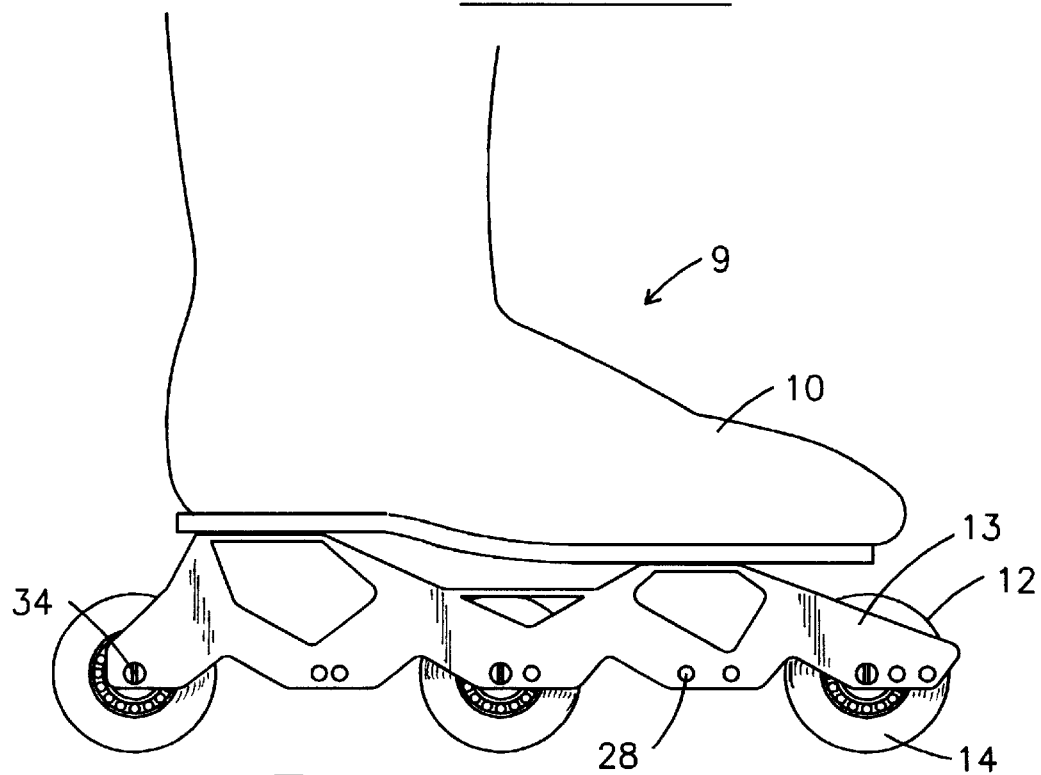
FIG. 11 is a side elevational view of the in-line skate housing showing a second alternate in-line skate wheel configuration.
Figure 18:
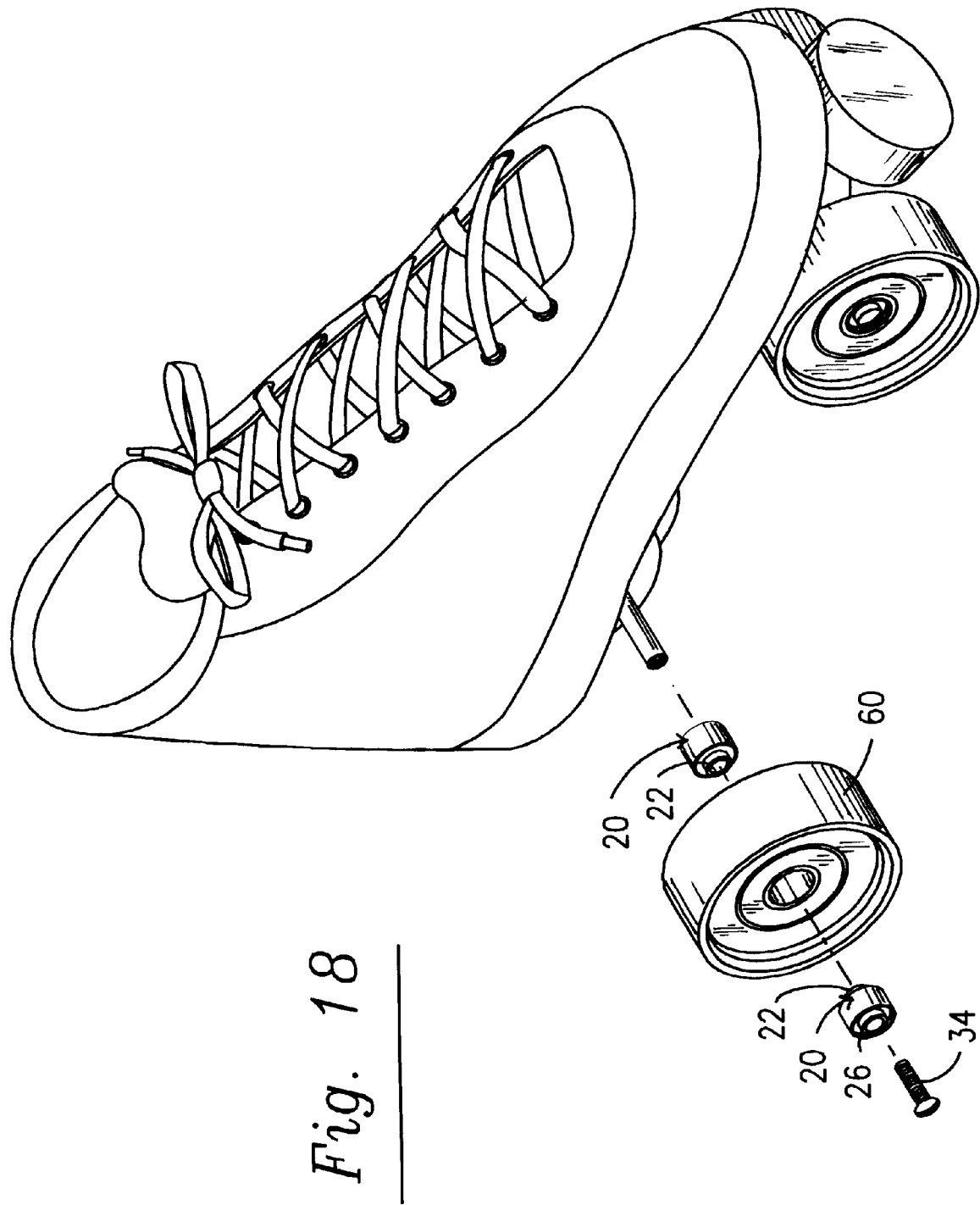
FIG. 18 is a perspective view of a roller skate with an exploded view of a roller skate wheel showing a pair of bearing inserts.
Figure 19:
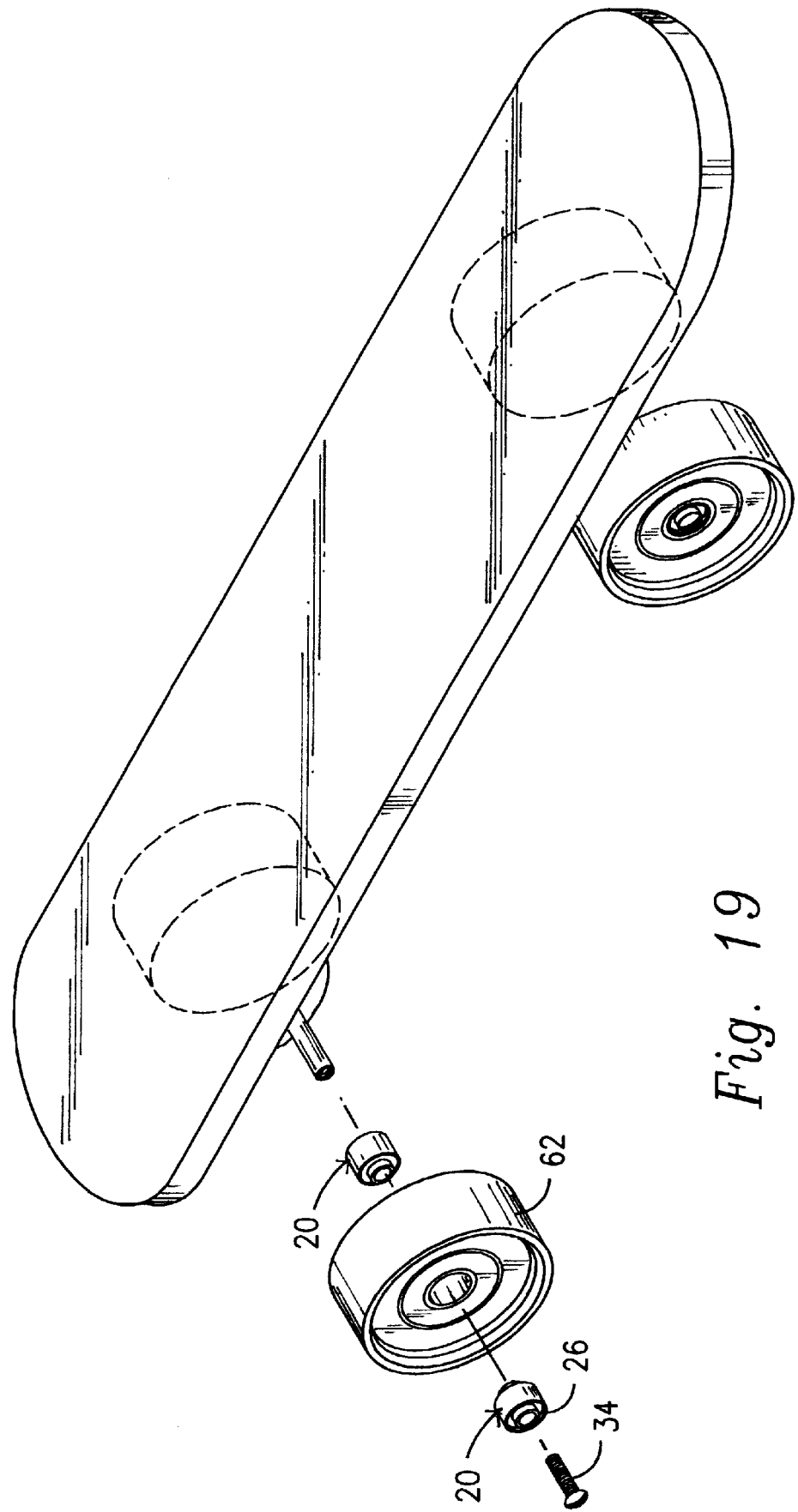
FIG. 19 is a perspective view of a skateboard with an exploded view of a skateboard wheel showing a pair of bearing inserts.

A pair of bearing inserts 20 are inserted into a hub 17 of an in-line skate wheel 14 as shown in FIG. 3, a roller skate wheel 60 as shown in FIG. 18, or a skateboard wheel 62 as shown in FIG. 19. The bearing insert 20 has a cylindrical inner race 66, a cylindrical outer race 64 rotatable around the inner race 66, a ball bearing positioner inserted between the outer and inner races, 64 and 66 respectively, and a set of ball bearings 68 inserted between the outer and inner races, 64 and 66 respectively, as shown in FIG. 6. The ball bearings 68 are held in place by the ball bearing positioner.

Referring to FIG. 6, the outer race 64 of the bearing insert 20 has a first axial end 70, a second axial end 72, an inner circumference 74, and an outer circumference 76. The inner race 66 of the bearing insert 20 has a first axial end 26, a second axial end 22, an inner circumference 56, an outer circumference 84, an integral cylindrical extension 78 of the second axial end 22, a central axial bore 86, and an annular inner groove 54 formed within the central axial bore 86 along the inner circumference 56. The integral extension 78 of the inner race 66 of a pair of bearing inserts 20 abut at a middle portion 19 of the hub 17 of the skate wheel 14 when inserted into a skate wheel 14 as shown in FIGS. 5 and 8.

Referring to FIGS. 14 and 16, the first axial end 70 of the outer race 64 and the first axial end 26 of the inner race 66 define an outer surface 88 of the bearing insert 20. Referring to FIGS. 16 and 17, a first reflective element 90 attaches to the outer surface 88 of the bearing insert 20. As shown in FIGS. 16 and 17, the bearing insert 20 has a flange 24 integral with the inner race 66 of the first axial end 26 of the inner race 66. The flange 24 has an outer circumference 23 with a first groove 25 formed in the outer circumference 23. The first reflective element 90 has a first annular opening 92 with a diameter corresponding to the diameter of the first groove 25 in the outer circumference 23 of the flange 24. The first annular opening 92 of the first reflective element 90 engages the first groove 25 of the flange 24 thereby attaching the first reflective element 90 to the outer surface 88 of the bearing insert 20. The first reflective element 90 shown in FIGS. 16 and 17 is annular, although a first reflective element 90 of a different shape could be employed to produce the same results.

Referring to FIGS. 14 and 15, an alternate embodiment of an attachment of a second reflective element 94 is shown. A second groove 98 is formed in the outer circumference 76 of the first axial end 70 of the outer race 64. The second reflective element 94 has a second annular opening 96 with a diameter corresponding to the diameter of the second groove 98 in the outer circumference 76 of the outer race 64. The second annular opening 96 of the second reflective element 94 engages the second groove 98 of the outer race 64 thereby attaching the second reflective element 94 to the outer surface 88 of the bearing insert 20. The second reflective element 94 shown in FIGS. 14 and 15 is annular, although a second reflective element 94 of a different shape could be employed to produce the same results.

Figure 12:
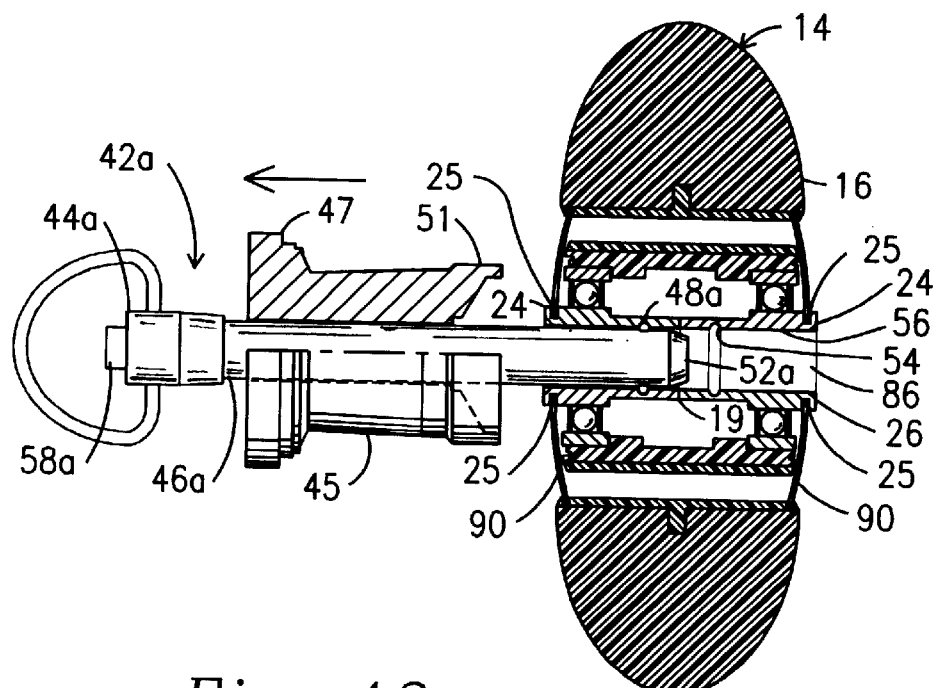
FIG. 12 is a sectional view of the in-line skate wheel along lines 8—8 of FIG. 7 with a preferred bearing insert tool having a finger grip portion inserted over a shaft of the tool removing a bearing insert from an in-line skate wheel.
Figure 13:
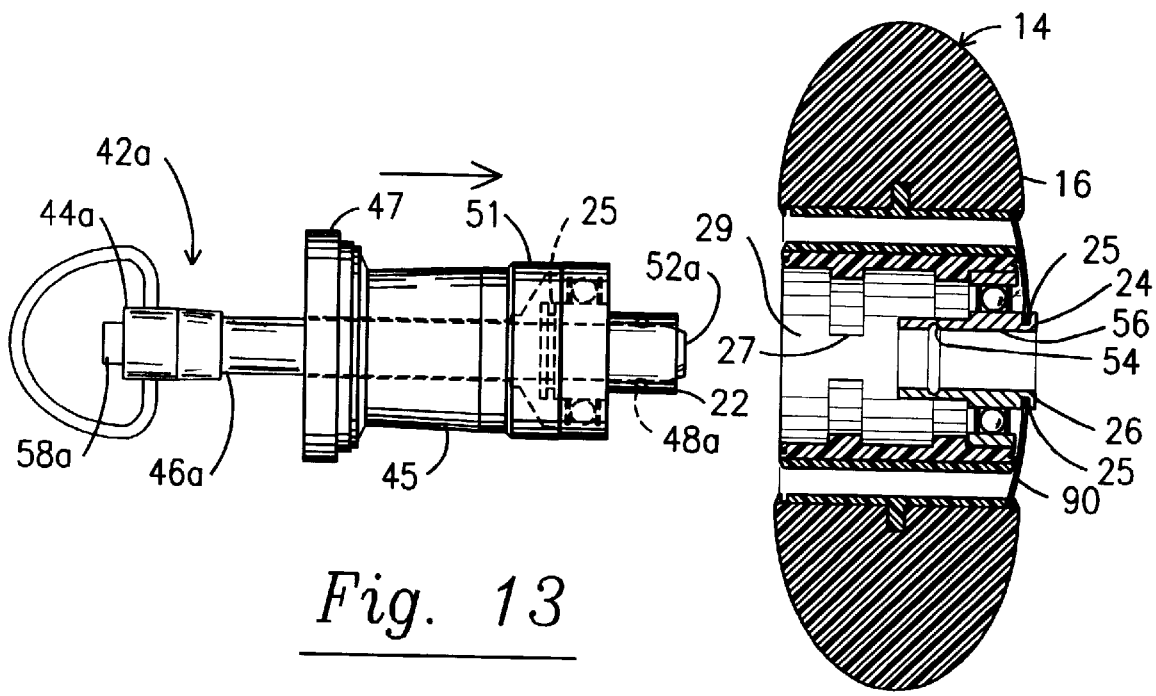
FIG. 13 is a sectional view of an in-line skate wheel along lines 8—8 of FIG. 7 with the preferred bearing insert tool having the finger grip portion inserted over the shaft of the tool inserting a bearing insert into an in-line skate wheel.

The bearing insert 20 is inserted and removed from the hut 17 of the skate wheel 14 utilizing a bearing insert tool 42a, as shown in FIGS. 12 and 13. The bearing insert tool 42a has a head portion 44a, a shaft 46a, nipples 48a located at a first distal end 52a to the head portion 44a, a spring, not shown, enclosed within the shaft 46a, a spring activation button 58a located in the head portion 44a, and a finger grip 45 having a crown portion 47 and a diameter at a second distal end 51 to the crown portion 47 corresponding to a diameter of the outer circumference 76 of the outer race 64 of the bearing insert 20.

An individual removes the bearing insert 20 from the hub 17 of the skate wheel 14 by depressing the spring activation button 58a. The button 58a communicates with the spring which in turn retracts the nipples 48a. The shaft 46a with the nipples 48a retracted is inserted into the central axial bore 86 of the bearing insert 20. The spring activation button 58a is released allowing the nipples 48a to engage the inner groove 54 formed along the inner circumference 56 of the inner race 66 within the central axial bore 86. The individual positions at least two fingers under the crown portion 47 of the bearing insert tool 42a. The tool 42a with the engaged bearing insert 20 is pulled in an axial direction away from the skate wheel 14 thereby removing the bearing insert 20 from the hub 17 of the skate wheel 14.

If the bearing insert 20 is going to be reused, it is advantageous to remove any dust, sand, grit, or flake particles inside the bearing insert 20 which are present after using the bearing insert in a skate wheel 14. The bearing insert 20 is submerged into a cleaning solution of gasoline, methylethylketone, or acetone to strip and clean the bearing insert 20, thereby removing any dust, sand, grit, or flake particles. The bearing insert 20 is removed from the cleaning solution and submerged in a rinsing solution of water. The bearing insert 20 is removed from the rinsing solution and allowed to dry. Mineral oil or light grade oil is applied to the ball bearings 68. The entire cleaning process is completed without disengaging the bearing insert tool 42a from the bearing insert 20, although the cleaning process can be completed by disengaging the bearing insert tool 42a from the bearing insert 20.

To replace the bearing insert 20 into the skate wheel 14, the bearing insert 20, engaged with the bearing insert tool 42a, is inserted into the hub 17 of the skate wheel 14. The individual positions the second distal end 51 of the finger grip 45 over the outer race 64 of the bearing insert 20, positions at least two fingers on the finger grip 45 of the bearing tool 42a, and pushes on the bearing insert 20 in an axial direction towards the skate wheel 14. The spring activation button 58a is depressed, retracting the nipples 48a from the inner groove 54. The bearing insert tool 42a is pulled in an axial direction away from the skate wheel 14, thereby removing the shaft 46a of the bearing insert tool 42a from the central axial bore 86 of the bearing insert 20. The spring activation button 58a is released allowing the spring to return to a relaxed state.

The entire removal, cleaning, and insertion process of a bearing insert 20 has been completed without the individual touching the bearing insert. It is advantageous to minimize contact with the compounds applied to the bearing insert 20 as well as those used in the cleaning process.

An alternate bearing insert tool 42 is shown in FIGS. 8 and 9. The alternate bearing insert tool 42 has a head portion 44, a shaft 46, nipples 48 located at a first distal end 52 to the head portion 44, a spring, not shown, enclosed within the shaft 46, and a spring activation button 58 located in the head portion 44. The removal, cleaning, and insertion process utilizing the alternate bearing insert tool 42 is identical to the preferred bearing insert tool 42a, except that the individual positions at least two fingers under the head portion 44 to remove the bearing insert 20 instead of positioning at least two fingers on the finger grip 45 of the preferred bearing insert tool 42a. To insert a bearing insert 20 into the skate wheel 14 not utilizing the bearing insert tool 42a, a thumb of the individual is used to push the bearing insert 20 into the hub 17 of the skate wheel 14.

Figure 2:
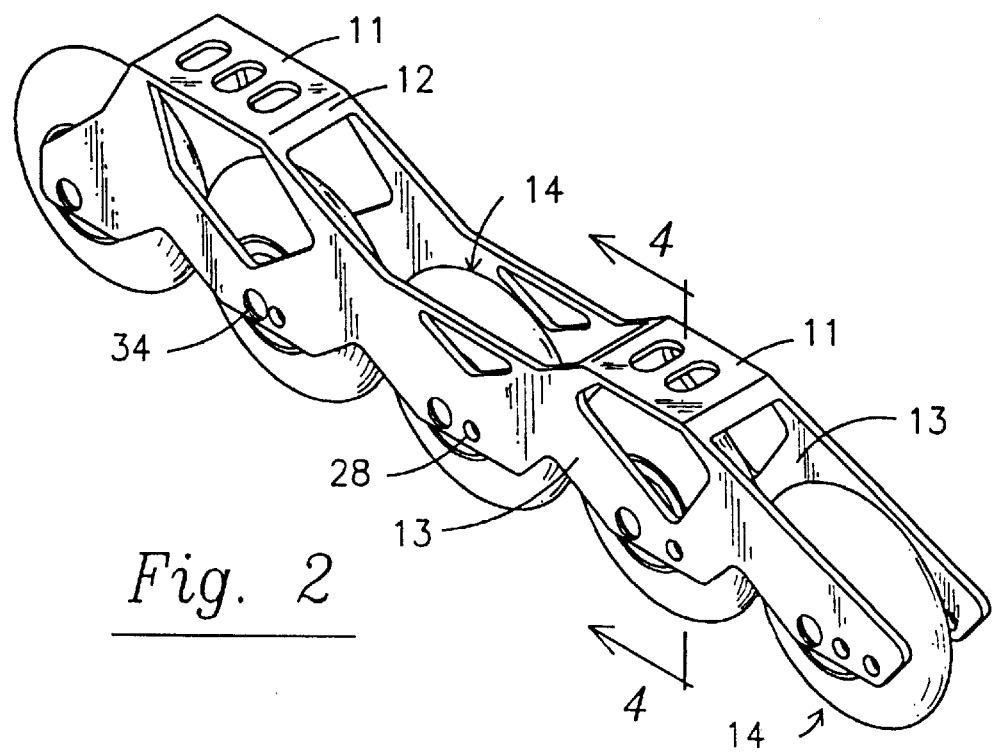
FIG. 2 is a perspective view of the in-line skate housing with five mounted wheels.

The bearing insert 20 is used with an in-line skate 9 of the following description. A skate boot 10 is attached by conventional means to the horizontal top plane 11 of a skate housing assembly 12 as shown in FIG. 1. A single row of skate wheels 14 are aligned along an undercarriage of the skate housing 12 as shown in FIG. 2. The row of skate wheels 14 are bolted to identical skirts 13 descending from opposite longitudinal side edges of the top plane 11 as shown in FIG. 2.

The skate wheel 14 consists of a circular polymer member 16, a mounting hub 17, and wheel axial bore 18 manufactured to receive a pair of bearing inserts 20 as shown in FIG. 3. Each bearing insert 20 is pressed into opposite sides of the wheel axial bore 18. The pair of bearing inserts 20 abut at the second axial end 22 of the inner race 66 of each bearing insert 20 in a middle portion 19 of the wheel axial bore 18 as shown in FIGS. 4, 5, 8, and 12. The flange 24 protrudes from the first axial end 26 of each bearing insert 20 as shown in FIGS. 3 and 6. A ridge 27 on an inner surface 29 of the mounting hub 17 provides a stop for an inner edge 23 at the second axial end 22 of the inner race 66 of the bearing insert 20 as shown in FIG. 3.

Each descending skirt 13 of the skate housing 12 contains a plurality of transverse bores 28 located along the longitudinal side plane of the skate housing 12 as shown in FIG. 3. Each transverse bore 28 has a corresponding wheel alignment pocket 30 located on the inside surface of the descending skirt 13 of the skate housing 12 along the longitudinal plane as shown in FIG. 6

The flange 24 of the first axial end 26 of the inner race 66 of the bearing insert 20 engages with the pocket 30, as shown in FIG. 6, to align the wheel 14. A bolt 34 axially aligns the transverse bore 28 at a first side 38 on the frame skirt 13 with the bearing insert 20 as shown in FIGS. 4 and 5. The bolt 34 is received by a female hex nut 36 inserted transversely from a second side 40 on the frame skirt 13 as shown in FIGS. 4 and 5.

Different skate wheels 14 of varying diameters and number may be substituted in the skate housing 12. The skate housing 12 may accommodate 3 to 5 skate wheels 14 with diameters ranging from 76 mm to 82 mm.

The skate frame housing 12 is generally made from a strong lightweight metal such as aluminum or titanium, but also could be constructed with a high strength polymer. The bolt 34 is, generally made from stainless steel. The circular member 16 and the hub 17 of the skate wheel 14 are generally made from a hard polymer.

The bearing insert 20 may be used with an in-line skate 9 of different description than described above. Additionally, the bearing insert 20 can be used with a roller skate wheel 60 as shown in FIG. 18 or a skateboard wheel 62 as shown in FIG. 19.

Equivalent mechanical devices can be substituted for the ones set forth above to achieve the same results in the same manner.

Having thus described the invention what is claimed and desired to be secured by Letters Patent is:

1. A pair of skate bearing inserts positioned in abutting relationship in a hub of a skate wheel, each skate bearing insert comprising, a cylindrical inner race having a first axial end, a second axial end, an inner circumference, an outer circumference, an integral cylindrical extension of the second axial end projecting beyond a stop on an inner circumference of the hub to abut the integral cylindrical extension of the second axial end of the other bearing insert, and a central axial bore, a cylindrical outer race having a first axial end, a second axial end, an inner circumference, and an outer circumference, the cylindrical outer race rotatable around the cylindrical inner race, the first axial end of the outer race and the first axial end of the inner race defining an outer surface of the bearing insert, a ball bearing positioner inserted between the inner circumference of the outer race and the outer circumference of the inner race, a set of ball bearings inserted between the inner circumference of the outer race and the outer circumference of the inner race, the ball bearings held in place by the ball bearing positioner, means along the inner circumference of the inner race for cooperating with a bearing insert tool for removing and inserting the bearing insert from the hub of the skate wheel, and means for attaching a reflective element to the outer surface of the bearing insert.

2. The pair of skate bearing inserts according to claim 1 wherein the integral cylindrical extension of the second axial end of the inner race of each bearing insert abut within the hub of the skate wheel at a middle portion of the hub.

3. The pair of skate bearing inserts according to claim 1 wherein the means along the inner circumference of the inner race for cooperating with a bearing insert tool for removing and inserting the bearing insert from the hub of the skate wheel is an annular inner groove formed within the central axial bore along the inner circumference of the inner race of the bearing insert.

4. The pair of skate bearing inserts according to claim 3 further comprising in combination the bearing insert tool for engaging the annular inner groove, the bearing insert tool having a head portion, a shaft with multiple retractable nipples located at a first distal end from the head portion, a spring enclosed within the shaft, a spring activation button located in the head portion, a finger grip rotatable around the shaft and having a crown portion and a diameter of a second distal end from the crown portion, the diameter of the second distal end corresponding to a diameter of the outer circumference of the outer race of the bearing insert, the shaft inserted into the central axial bore of the inner race of the bearing insert, the spring activation button relaxed so that the nipples are capable of engaging the inner groove to remove the bearing insert from the hub, and the spring activation button is capable of being compressed to retract the nipples to remove the bearing insert from the bearing insert tool.

5. The pair of skate bearing inserts according to claim 1 wherein the means for attaching a reflective element to the outer surface of one bearing insert comprises, a flange having an outer circumference, the flange integral with the inner race at the first axial end of the inner race, a first annular groove along the outer circumference of the flange, a first reflective element having a first annular opening,, the first annular opening having a diameter corresponding to the diameter of the first groove along the outer circumference of the flange and engaging the first groove.

6. The pair of skate bearing inserts according to claim 1 wherein the means for attaching a reflective element to the outer surface of one bearing insert comprises, a second annular groove along the outer circumference of the second axial end of the outer race, a second reflective element having a second annular opening, the second annular opening having a diameter corresponding to the diameter of the second groove along the outer circumference of the outer race and engaging the second groove.

7. A pair of skate bearing inserts positioned in abutting relationship in a hub of a skate wheel, each skate bearing insert comprising, a cylindrical inner race having a first axial end, a second axial end, an inner circumference, an outer circumference, an integral cylindrical extension of the second axial end, and a central axial bore, the integral cylindrical extension of the second axial end of the inner race of each bearing insert abutting within the hub of the skate wheel at a middle portion of the hub, a cylindrical outer race having a first axial end, a second axial end, an inner circumference, and an outer circumference, the cylindrical outer race rotatable around the cylindrical inner race, the first axial end of the outer race and the first axial end of the inner race defining an outer surface of the bearing insert, a ball bearing positioner inserted between the inner circumference of the outer race and the outer circumference of the inner race, a set of ball bearings inserted between the inner circumference of the outer race and the outer circumference of the inner race, the ball bearings held in place by the ball bearing positioner, an annular inner groove formed within the central axial bore along the inner circumference of the inner race for engagement with a bearing insert tool for removal and insertion of the bearing insert from the hub, and means for attaching a reflective element to the outer surface of the bearing insert.

8. The pair of skate bearing inserts according to claim 7 wherein the means for attaching a reflective element to the outer surface of one bearing insert comprises, a flange having an outer circumference, the flange integral with the inner race at the first axial end of the inner race, a first annular groove along the outer circumference of the flange, a first reflective element having a first annular opening, the first annular opening having a diameter corresponding to the diameter of the first groove along the outer circumference of the flange and engaging the first groove.

9. The pair of skate bearing inserts according to claim 7 wherein the means for attaching a reflective element to the outer surface of one bearing insert comprises, a second annular groove along the outer circumference of the second axial end of the outer race, a second reflective element having a second annular opening, the second annular opening having a diameter corresponding to the diameter of the second groove along the outer circumference of the outer race and engaging the second groove.

\* \* \* \* \*